Figure 1:
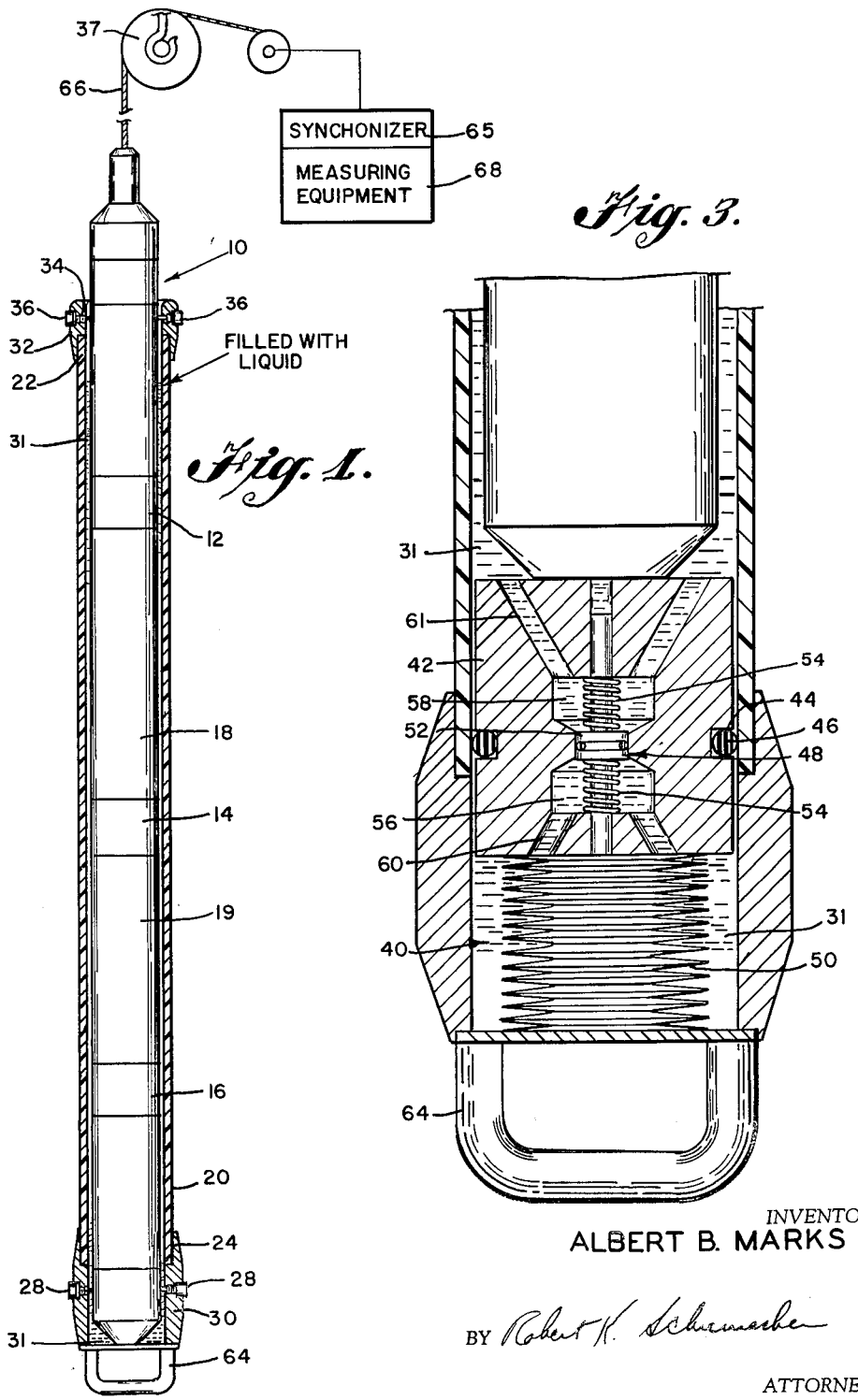

Oct. 2, 1962

A. B. MARKS 3,056,464

CALIBRATION AND HANDLING DEVICE FOR
ACOUSTIC LOGGING INSTRUMENTS

Filed Sept. 16, 1959

2 Sheets-Sheet 2

INVENTOR
ALBERT B. MARKS

BY Robert K. Schumacher

ATTORNEY

United States Patent Office 3,056,464
Patented Oct. 2, 1962

3,056,464
CALIBRATION AND HANDLING DEVICE FOR
ACOUSTIC LOGGING INSTRUMENTS
Albert B. Marks, Tulsa, Okla., assignor, by mesne assignments, to Dresser Industries, Inc., Dallas, Tex., a corporation of Delaware
Filed Sept. 16, 1959, Ser. No. 840,423
1 Claim. (Cl. 181—.5)

The present invention relates to an improved calibration device for acoustic logging instruments, and more particularly relates to an improved calibration device also useful in handling and storing acoustic well logging instruments.

As is well known, acoustic well logging instruments are generally several inches in diameter and ten to thirteen feet long, and are composed of rigid sections interconnected by flexible or semi-flexible sections. Along the length of the instrument there are several acoustic transducers, usually comprising one transmitter and one or more receivers. The instrument is operated by producing at a transmitter in the instrument, an acoustic signal which is propagated through the surrounding medium, which is usually the borehole fluid, and into the surrounding earth or rock. There are portions of the signal which re-enter the borehole fluid from the rock and are detected at each receiver as a signal. The time differences in receiving each of these signals after the acoustic signal was transmitted by the transmitter, together with the amplitude and character changes of the signal, are useful in determining and evaluating acoustic properties of the surrounding earth or rock.

In order to calibrate the logging instrument for accurate determination of acoustic properties, it is necessary to operate the instrument in an environment having known acoustic properties. This has been accomplished in the prior art by placing the logging instrument in a large body of liquid, such as water, or in a trough filled with a liquid. The calibration device should be portable and convenient for use so that calibrations may be accomplished in the field before and after logging operations, or as otherwise and often as desired.

It has been found that a semi-flexible logging instrument is difficult to handle and store in conventional instrument racks, such as those that are built into well logging trucks. It is therefore desirable to have a handling fixture or device for holding the logging instrument that is straight and substantially stiff or rigid in nature, but without adding appreciably to the weight or the bulk of the logging instrument. Where the calibration device is made small and fits closely around a logging instrument, the results are found desirable because the amount of fluid required during the calibration operation is quite small in quantity. This is an advantage where sufficient quantities of appropriate fluid or liquid are hard to obtain during well logging operations.

It is an object of the invention to provide a device or fixture that combines the function of calibrating with a means for handling and storing acoustic logging instruments.

It is a further object of the present invention to provide a small, light-weight, portable calibration device for acoustic well logging tools wherein the acoustic properties of the calibration device are like those of the earth.

A further object of the present invention is to provide an acoustic well logging tool having a captive recess or chamber for retaining the calibrating liquid within the calibration device when the tool is removed therefrom and such liquid is retained in the captive chamber even when the calibration device is in a substantially horizontal position and the liquid would otherwise flow out of the device.

It is a further object of the invention to provide a combination calibrator unit that requires only a small increase in storage space over that initially required for the logging instrument.

It is an additional object of the invention to provide an acoustic well logging calibration unit that is not easily damaged, will not dent, has built-in means for clamping or securing the acoustic logging instrument for storage and handling, and has means for draining the combination unit of liquids.

A more complete understanding of the invention may be obtained from a study of the following detailed description of one generalized and specific embodiment thereof.

Figure 2:
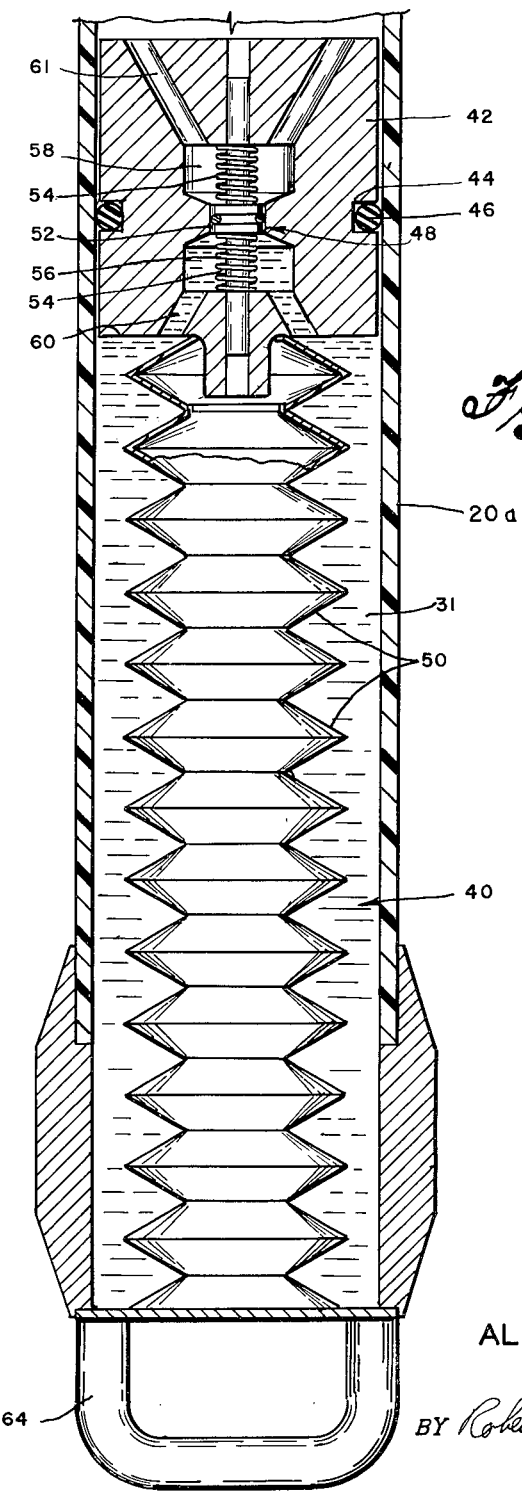

In the drawings:

FIG. 1 is a side elevational view partially in cross-section of an embodiment of the present invention; and FIGS. 2 and 3 are detailed cross-sectional views of a captive chamber in accordance with a preferred embodiment of the present invention.

Referring now to the figures, there is shown an acoustic well logging tool 10 having a transmitting transducer 12, a first receiving transducer 14, and a second receiving transducer 16. The transmitting and receiving transducers are the active elements of the tool necessary in performing the well logging function. The transmitting and receiving transducers are separated from each other along the length of the tool by semi-flexible acoustic isolators 18, 19 which may be constructed partly of a rubber material. These isolators break up the sound transmission path that would otherwise exist directly through the tool.

Of course, it is within the scope of the invention to calibrate other acoustic logging tools having more or less number of transmitting and receiving transducers. The acoustic well logging tool is shown stored and fitting within a hollow tubing 20, having one end 22 thereof open and the other end 24 closed for holding liquid during the calibration operation. The length of the hollow tubing is sufficient to enclose the active elements or transducers of the tool, which includes the enclosure of the semi-flexible acoustic isolators 18, 19 positioned between the active elements of the tool. In this respect the tubing is effective as a handling device as well as a calibrator, since the tubing tends to hold the tool in a rigid position so that it is protected from undesirable movement and damage of any internal structures of the isolators, such as electrical conductors and the like, that may be stretched under these undesirable movements. The wall of the tubing may be constructed of a single or several laminations or layers of material. The material may be of a fine, flexible glass fiber made by attenuating molten glass streams flowing from small holes to form a mass useful for heat, sound and shock insulation, and sold under the trademark Fiberglas. The material is mixed or combined with a plastic to give the composite structure a semi-rigid characteristic.

The longitudinal acoustic wave velocity characteristic of the Fiberglas-plastic tubing 20 is about 9,300 feet per second, lower than the acoustic wave velocity characteristic for structural metals, and within the range of values for acoustic wave velocities in formations of earth to be measured. It is also within the purview of the present invention to use steel or aluminum as the material forming the tubing. Aluminum, for example, has an acoustic wave velocity characteristic of about 17,000 feet per second. This value of velocity characteristic is near the upper limit of useful values of material of which the tubing may be constructed. The range of useful values that usually are considered for recording in acoustic well logging is from 5,000 feet per second to 25,000 feet per second and the velocity of sound in the calibrator material should be within this range.

A nose assembly 30 is secured by a cement or paste material serving as an adhesive onto an end of the plastic tubing 20 and forms the closed end 24 thereof. Drain plugs 28 threadedly engage openings in the nose assembly 30, and upon removal, allow liquid 31 to be conveniently drained off and serve additionally as a clamp when the drain plugs are positioned to abut against the tool 10.

The open end 22 of the tubing is provided with a collar 32 constructed of low carbon steel or a like metal to protect the edges of the tubing from being damaged. The collar is provided with sockets 34 threadedly engaging cap screws 36 that may be used also in clamping the acoustic well logging tool within the tubing 20.

Although the tubing may be clamped to the tool at either the open or closed end of the tubing, it is preferred to clamp the tubing to the tool from the closed end during calibration, since it is found that in a semi-rigid logging tool, small differences in its length, during calibration from its length during logging occasioned by longitudinal compression of the tool, such as that due to the logging tool resting on its lower end affect the calibration of the tool. The differences in length are apparent from the tension or compression of the isolators 18, 19. If the tool were lowered into the tubing, and clamped therein by the plugs 28, then as the tool was suspended by a cable from a sheave wheel 37 supported from a derrick (not shown), the semi-rigid logging tool would be elongated due to the stretching of the isolators 18, 19 under tension similar to that during logging. If, however, the tool were inserted to the bottom of tubing 20 and then clamped by cap screws 36, the rigid tubing 20 would hold the isolators under compression, so that if the tool were now calibrated, different calibrations would be obtained than by using the calibration tubing than if the logging tool were allowed to be freely suspended. It is therefore found preferable to insert the logging tool into the calibration device, and clamp the nose end of the calibrator to the nose end of the tool by the plugs 28. Then when the tool is suspended by the sheave wheel which is supported by the derrick, the logging tool has substantially the same length as the logging tool has when suspended in the borehole. The added weight of the tubing 20 supported by the screws 36 is substantially nil in effecting any additional tension upon the isolators 18, 19.

A captive recess or chamber 40 is shown in FIG. 2 formed in the lower end of the tubing 20 by a movable piston 42. The peripheral portion of the piston has an annular groove 44 for inserting therein an O-ring 46 to form a liquid seal between the piston 42 and the walls 20a of the chamber. In the central portion of the piston, there is a two-way check valve 48 of a conventional design. In the chamber between the piston 42 and the nose assembly is a stacked array of the Belleville type springs 50, or the like.

The spring 50 serves to hold the piston in a raised or extended position from the nose assembly 30, and a valve head 52 of the check valve 48 is biased to rest in a position that normally closes the check valve, as shown.

However, when a liquid 31 is present in the tubing, and the pressure differential of the liquid across the check valve is sufficient to overcome the bias spring 54 of the valve head 52 so that the liquid is displaced downwardly into a lower cavity 56. Such displacement of the valve head allows the liquid 31 to flow from above the piston through an upper cavity 58 and the lower cavity 56, around the valve head 52, now positioned in the lower cavity, through a passage 60, and into the captive chamber 40. When liquid ceases to flow downwardly through the check valve, a dynamic balance is achieved between the absence of weight of the liquid, the applied bias spring 54, and the spring 50 urging the piston upwardly, thus returning the valve head to its normally closed position.

In order to calibrate the acoustic well logging tool 10 by using the characteristics of the tubing 20, the tool is lowered into the tubing until the lower end thereof contacts the piston 42. The weight of the tool, being several hundred pounds, displaces the piston 42 downwardly by overcoming the bias of the spring 50. The liquid 31 in the captive chamber, being incompressible, now displaces the valve head upwardly into upper cavity 58 and the liquid in the captive chamber flows through passages 60, through the lower cavity 56, the upper cavity 58, around the valve head 52 now present in the upper cavity, and through the passages 61 in the upper portion of the piston 42 to fill the space between the tool and the tubing.

When the tool 10 is lifted from the tubing 20, the bias of spring 50 exerts the piston upwardly, and the weight, or force due to the flow of water flowing through the check valve 48 holds the valve head in the lower cavity 56 so that the liquid is allowed to flow into the captive cavity until it is filled or the spring 50 has expanded to its maximum position.

A carrying handle 64 is secured onto the nose assembly 30 so that a firm and positive grip on that end of the tubing is obtained.

The tubing is used for calibration purposes when the acoustic well logging tool is placed within the tubing. The transmitting transducer of the logging tool is pulsed by a synchronizer 65 over a cable 66 so that acoustic signal energy is sent out from the tool passing through the liquid in the tubing and into the walls thereof. The acoustic energy travels along the walls of the calibration tubing and portions of the energy are received by the receiving transducers 14, 16 of the acoustic well logging tool. The energy that is received by the receiving transducers has been delayed in time from the transmission of the energy at the transmitting transducer by a time proportional to the distance that the acoustic wave travels along the wall of the tubing. The receiving transducers are coupled to measuring equipment 68 so that it may be determined, under normal comparable subsurface conditions, that the acoustic well logging tool transmits acoustic energy and receives acoustic energy after a predetermined time interval simulating subsurface conditions. Thus, measurements made while the instrument is in the tubing 20, provide calibration standards against which well measurements can be compared. As the velocity of sound in the tubing 20 is known, the velocities in the remote formations can be determined by comparison of well measurements with measurements made with the logging tool in the tubing.

It is to be understood that the above described arrangements for calibration of acoustic well logging tools are illustrative of the application of the principles of the invention. Numerous other arrangements may be devised by those skilled in the art without departing from the spirit and the scope of the invention.

I claim:

A calibration device for acoustic well logging tools, comprising a substantially rigid hollow tubing sufficiently long to enclose active elements of an acoustic well logging tool, and having the hollow portion thereof large enough to receive the diameter of the acoustic well logging tool, said tubing being transmissive of acoustic waves at a velocity within the range of 5,000 to 25,000 feet per second, a nose assembly closing off one end of the hollow tubing, and a piston in the hollow tubing, said piston being spring-supported from the nose assembly and forming a captive chamber for receiving calibrator liquid so that the liquid is emptied therefrom when a well logging tool is inserted in the hollow tubing and the liquid is captively contained in the chamber when the tool is removed from the hollow tubing.

References Cited in the file of this patent

UNITED STATES PATENTS

| | | |
|---|---|---|
| 2,918,651 | Podolak et al. | Dec. 22, 1959 |
| 2,970,666 | Smith | Feb. 7, 1961 |